(12) United States Patent
Lippincott et al.

(10) Patent No.: US 7,714,870 B2
(45) Date of Patent: May 11, 2010

(54) APPARATUS AND METHOD FOR SELECTABLE HARDWARE ACCELERATORS IN A DATA DRIVEN ARCHITECTURE

(75) Inventors: Louis A. Lippincott, Chandler, AZ (US); Patrick F. Johnson, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 568 days.

(21) Appl. No.: 10/601,617

(22) Filed: Jun. 23, 2003

(65) Prior Publication Data

US 2004/0257370 A1    Dec. 23, 2004

(51) Int. Cl.
G06F 15/16 (2006.01)
G06F 15/80 (2006.01)
G06T 1/00 (2006.01)
G09G 5/36 (2006.01)

(52) U.S. Cl. ............... 345/502; 345/505; 345/559; 345/522

(58) Field of Classification Search ......... 345/501–506, 345/520, 522, 559, 530; 712/10–12, 16, 712/21, 25–28, 35, 34, 3, 18, 23
See application file for complete search history.

(56) References Cited

U.S. PATENT DOCUMENTS

| | | | | |
|---|---|---|---|---|
| 4,949,280 | A * | 8/1990 | Littlefield | 345/505 |
| 5,940,086 | A * | 8/1999 | Rentschler et al. | 345/506 |
| 6,275,891 | B1 * | 8/2001 | Dao et al. | 710/317 |
| 6,292,200 | B1 * | 9/2001 | Bowen et al. | 345/506 |
| 6,301,603 | B1 | 10/2001 | Maher et al. | |
| 6,311,204 | B1 * | 10/2001 | Mills | 718/100 |
| 6,477,177 | B1 * | 11/2002 | Potts | 370/437 |
| 6,624,816 | B1 * | 9/2003 | Jones, Jr. | 345/503 |
| 6,891,893 | B2 * | 5/2005 | Sullivan et al. | 375/240.25 |
| 6,930,689 | B1 * | 8/2005 | Giacalone et al. | 345/502 |
| 2003/0028751 | A1 * | 2/2003 | McDonald et al. | 712/34 |

FOREIGN PATENT DOCUMENTS

GB        2386442 A        9/2003

(Continued)

OTHER PUBLICATIONS

Intel Corporation, Substantive Examination Adverse Report and Search Report issued on Feb. 6, 2008, Malaysian Patent Application PI 20043240, 4 pages.
The Corporation, Notice of Rejection mailed on Jan. 15, 2008, Japanese Patent Application No. 2006-515357, 3 pages.

(Continued)

*Primary Examiner*—Hau H Nguyen
(74) *Attorney, Agent, or Firm*—Blakely, Sokoloff, Taylor & Zafman LLP

(57) ABSTRACT

A method and apparatus employing selectable hardware accelerators in a data driven architecture are described. In one embodiment, the apparatus includes a plurality of processing elements (PEs). A plurality of hardware accelerators are coupled to a selection unit. A register is coupled to the selection unit and the plurality of processing elements. In one embodiment, the register includes a plurality of general purpose registers (GPR), which are accessible by the plurality of processing elements, as well as the plurality of hardware accelerators. In one embodiment, at least one of the GPRs includes a bit to enable a processing element to enable access a selected hardware accelerator via the selection unit.

24 Claims, 9 Drawing Sheets

FOREIGN PATENT DOCUMENTS

| | | |
|---|---|---|
| JP | 2001-167058 | 6/2001 |
| WO | WO 02/088936 | 11/2002 |
| WO | WO 03/003232 | 1/2003 |

OTHER PUBLICATIONS

Intel Corporation, Communication mailed on May 28, 2008, EP Patent Application No. 00753354.2-2211, 6 pages.

* cited by examiner

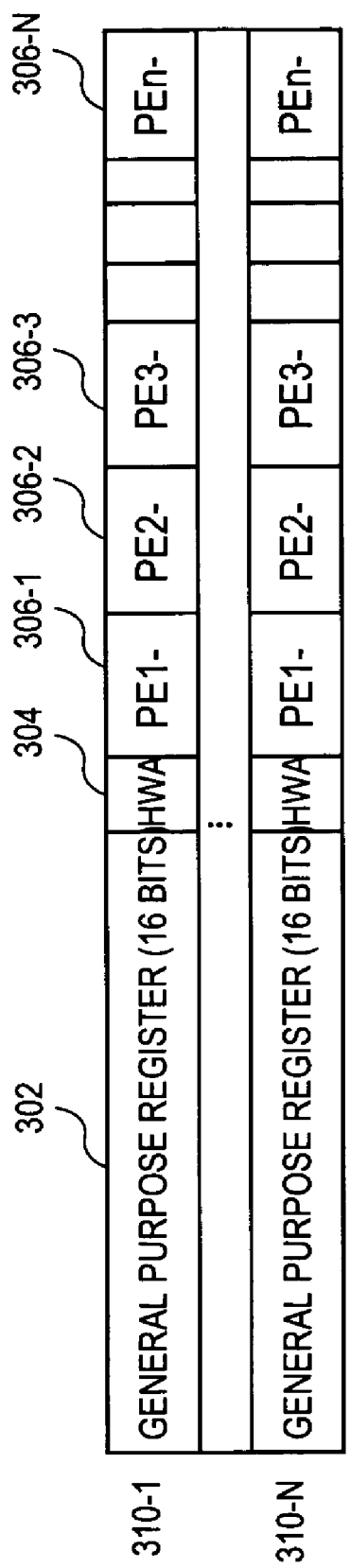
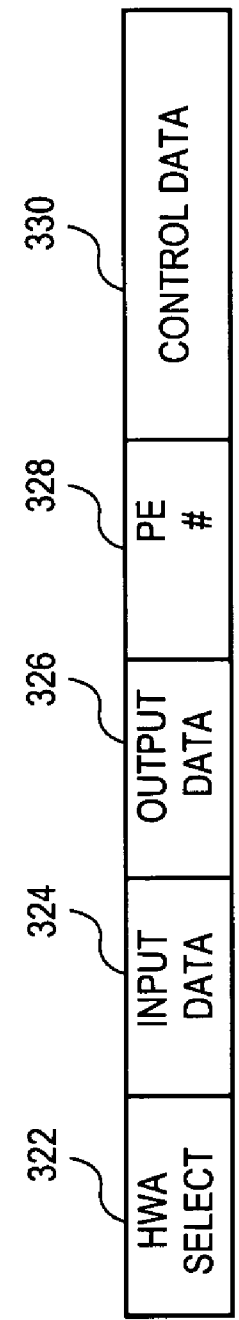

APPARATUS AND METHOD FOR SELECTABLE HARDWARE ACCELERATORS IN A DATA DRIVEN ARCHITECTURE

FIELD OF THE INVENTION

One or more embodiments of the invention relate generally to the field of digital signal processing. More particularly, one or more of the embodiments of the invention relates to a method and apparatus for selectable hardware accelerators in a data driven hardware.

BACKGROUND OF THE INVENTION

Multiprocessing digital signal processors generally use a hierarchical or peer-to-peer processor array. Unfortunately, when new processing elements are added to the digital signal processors, a rewrite of pre-existing code is often required. Moreover, the software that runs the digital signal processors is dependent on hardware timing and is thus not portable across different silicon process technologies. As a result, binary or assembly code written on one version of these processors may not be portable to other versions that have different processing elements. One technique for implementing multiprocessing digital signal processors is the use of a data driven architecture.

In contrast to a data driven architecture, processors currently in widespread use are developed according to so-called Von Newman logic. According to Von Newman logic, processors sequentially process instructions, one at a time. In addition, Von Newman processors operate using a clock to control data input/output (I/O) and execute programs one instruction at a time. As a result, increasing processing speed requires an increase in clock frequency that leads increased power consumption.

In other words, the functioning of a microprocessor requires synchronization of data transfer and writing data to memory. One method of synchronizing is to tie all circuits to a common signal called a clock signal. Unfortunately, because the majority of internal circuitry is tied to this clock, the internal circuitry does not perform well when processing data intensive applications. In contrast, data driven architectures utilize processors that process without regard to data sequence and only when data is available. Accordingly, because multiple programs are read whenever multiple data is input, data processing is performed in parallel within data driven architectures.

Hardware accelerators are designed to accelerate commonly used data processing functions or operations to improve and speed up processing. In a data driven architecture, several hardware accelerators may be embodied in digital processing units to improve data processing performance. Unfortunately, the number of hardware accelerators that can be controlled within a digital processing unit is limited by several factors such as addressing of the hardware accelerators. As a result of these limitations, the number of hardware accelerators is limited to a few very large and complex hardware accelerators. This desire conflicts with the desire to have several smaller and simpler hardware accelerators within the digital processing units of the data driven architecture.

BRIEF DESCRIPTION OF THE DRAWINGS

The various embodiments of the present invention are illustrated by way of example, and not by way of limitation, in the figures of the accompanying drawings and in which:

FIG. 3A is a block diagram further illustrating the communication control register of FIGS. 1 and 2, in accordance with a further embodiment of the invention.

FIG. 3B is a block diagram illustrating a hardware accelerator control register, in accordance with one embodiment of the invention.

DETAILED DESCRIPTION

Figure 1:
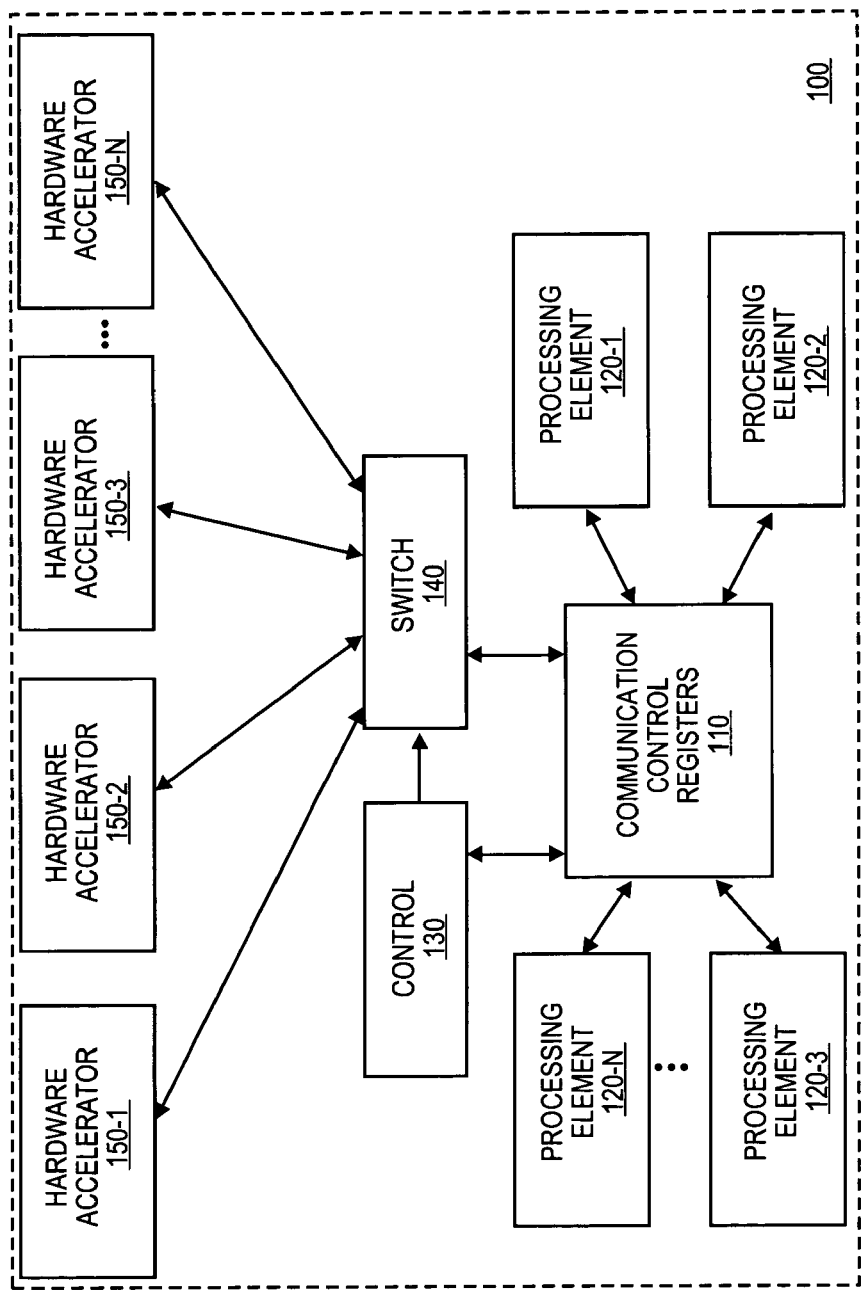
FIG. 1 is a block diagram illustrating a media signal processor, in accordance with one embodiment of the invention.

A method and apparatus employing selectable hardware accelerators in a data driven architecture are described. In one embodiment, the apparatus includes a plurality of processing elements (PEs). A plurality of hardware accelerators are coupled to a selection unit. In addition, a register is coupled to the selection unit and the plurality of processing elements. In one embodiment, the register includes a plurality of general purpose registers (GPR), which are accessible by the plurality of processing elements, as well as the plurality of hardware accelerators. In one embodiment, at least one of the GPRs includes a bit to enable a processing element to access a selected hardware accelerator via the selection unit.

Media processing applications typically perform small sets of operations on large amounts of data. General purpose processors designed for instruction flow applications do not perform well on data-intensive applications since general purpose processors are designed according to Von Newman logic. According to Von Newman logic, the processors sequentially process instructions one at a time. In addition, the functioning of the general purpose processor requires synchronization of data transfer and writing data to memory. This synchronization method is usually performed by tying all circuits to a common signal called a clock signal.

Accordingly, recent advances have led to the use of data driven architectures for data intensive applications, such as image processing applications. In contrast to general purpose processors, data driven architectures utilize processors that function without regard to data sequence and only when data is available. Since programs are read whenever multiple data is input, data processing is performed in parallel within data driven architectures. Accordingly, one embodiment provides a media signal processor (MSP), which may be incorporated within a data driven architecture to perform data intensive applications, such as media processing applications, including, but not limited to, video processing, image processing, sound processing, security based applications and the like.

As illustrated, media signal processor (MSP) 100 is comprised of one or more processing elements 120 (120-1, . . . , 120-n). As illustrated, each processing element (PE) 120 is coupled to communication control register file 110. Register file 110 allows PEs 120 to exchange data, as well as providing storage capability within the one or more general purpose registers (GPRs) contained within register file 110. PEs 120 are the basic building blocks of MSP 110 and may include an instruction set designed to provide flow control, arithmetic logic unit functions and custom interface functions, such as multiply-accumulate instructions, bit rotation instructions, or the like. As such, depending on the function MSP 100 is designed to perform, PEs 120 may be divided to accomplish the desired functionality and parallel perform algorithmic portions of a media processing application implemented by media signal processor 100.

To improve, as well as expedite, the performance of a media processing application, MSP 100 includes a plurality of hardware accelerators 150 (150-1, . . . , 150-n) Conventionally, hardware accelerators are designed to provide hard-wired logic to accelerate commonly used media functions. For example, if MSP 100 is configured to perform imaging applications, the hardware accelerators can be configured to perform, for example, bi-level text encoder/decoder functions, a joint photographic exports group (JPEG), Hoffman encoder/decoder functions or 2D triangular filter functions.

In such configurations, the hardware accelerators would be limited to either one or two hardware accelerators, which are hard wired to communication control registers 100. In addition, the hardware accelerators are controlled directly by the PEs 120. The instruction set of the PEs 120 is designed to handle addressing of the hardware accelerators and other PEs 120 in the MSP. Unfortunately, the number of PEs and hardware accelerators that can be controlled by a PE 120 is limited by several factors, including the number of bits in the instruction word allocated to the addressing of the hardware accelerators. As a result, it is therefore desirable to limit the number of hardware accelerators and resulting control bits in a conventional image signal processing unit.

In contrast to conventional image signal processing units, MSP 100 is designed to use several smaller and simpler hardware accelerators, as opposed to a pair of very large and complex hardware accelerators of conventional image signal processors. In one embodiment, control logic 130, as well as switch 140, are provided to accommodate the plurality of hardware accelerators. Accordingly, the PEs 120 are able to direct a selected hardware accelerator via registers within communication control register file 110. Enablement and activation of the selected hardware accelerators by PEs 120 is described in further detail below. Accordingly, MSP 100 may be configured to concurrently perform image processing applications, video processing applications, audio processing applications, security processing applications and the like by implementing portions of the desired technology ("media processing functions") within designated hardware accelerators.

Figure 2:
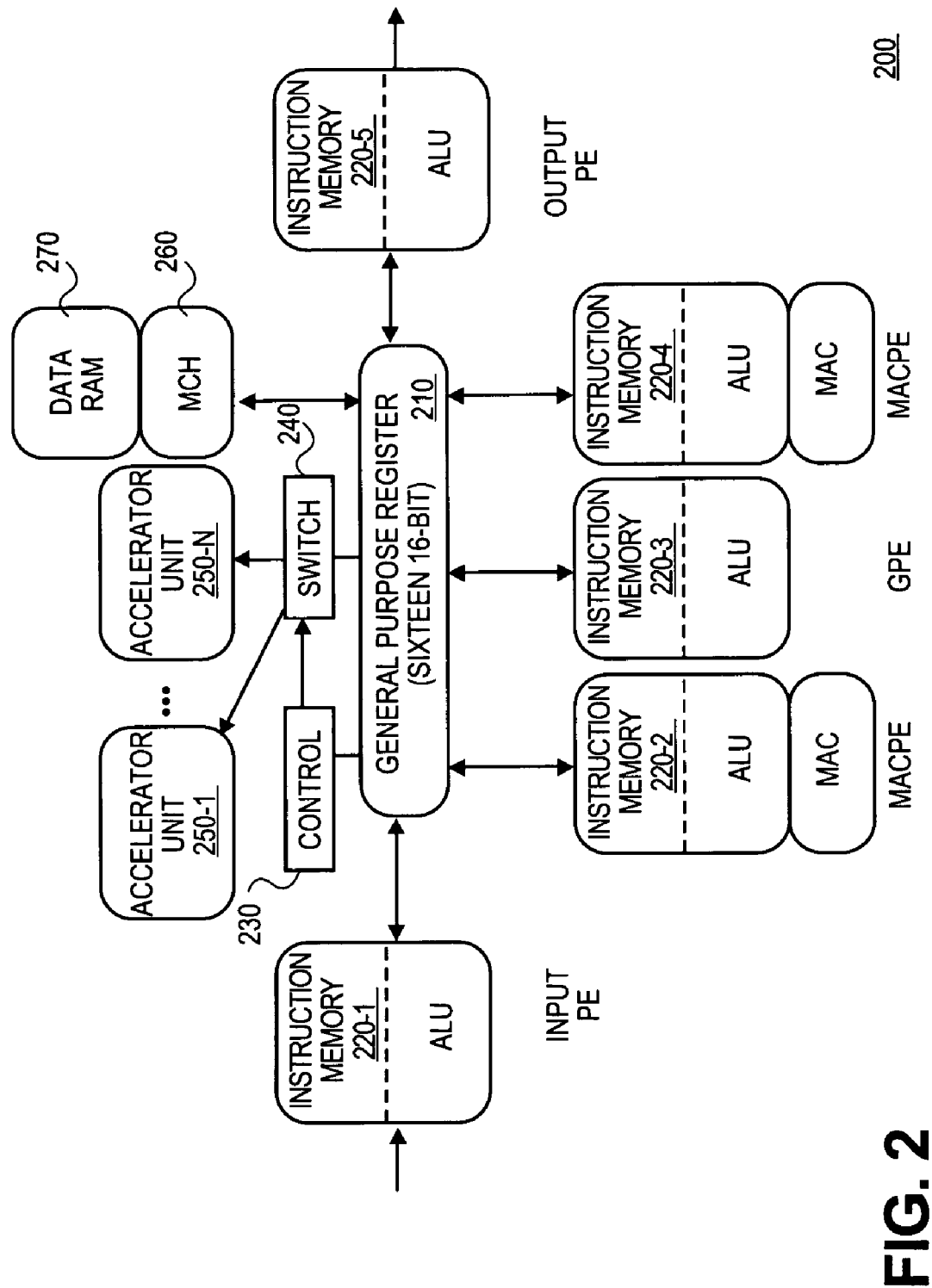
FIG. 2 is a block diagram illustrating a media signal processor, in accordance with a further embodiment of the invention.
Figure 4:
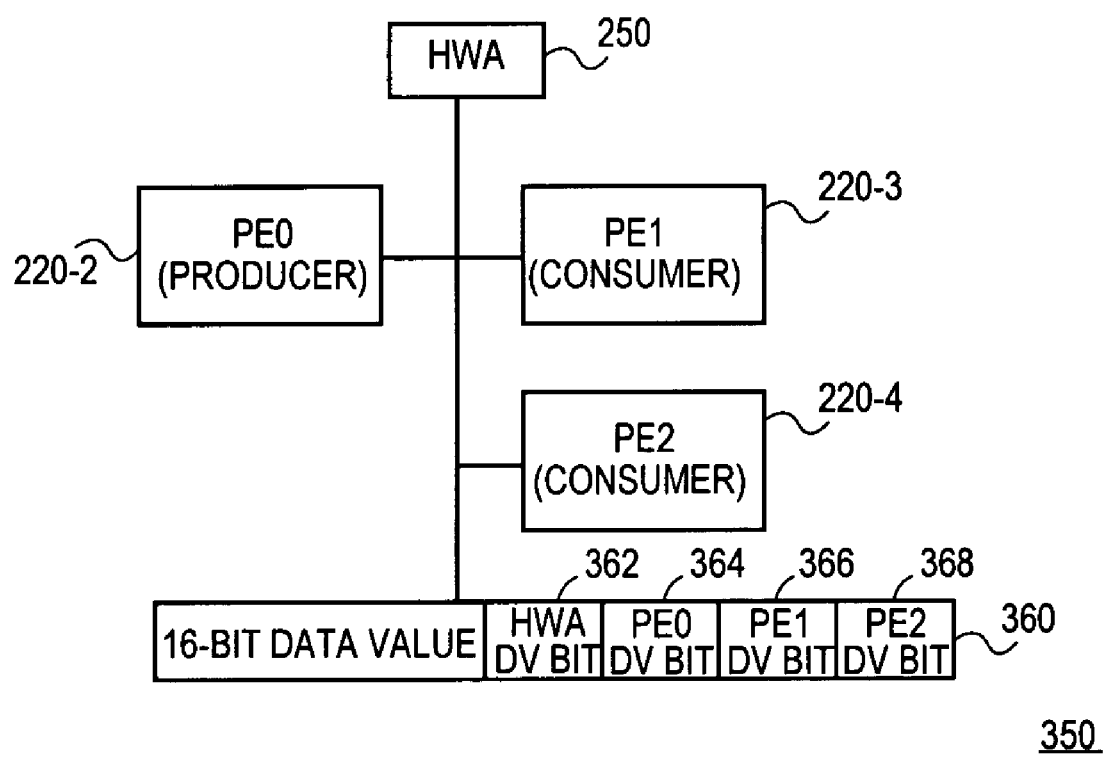
FIGS. 4-9 illustrate hardware accelerator access for data driven processing, in accordance with one embodiment of the invention.
Figure 5:
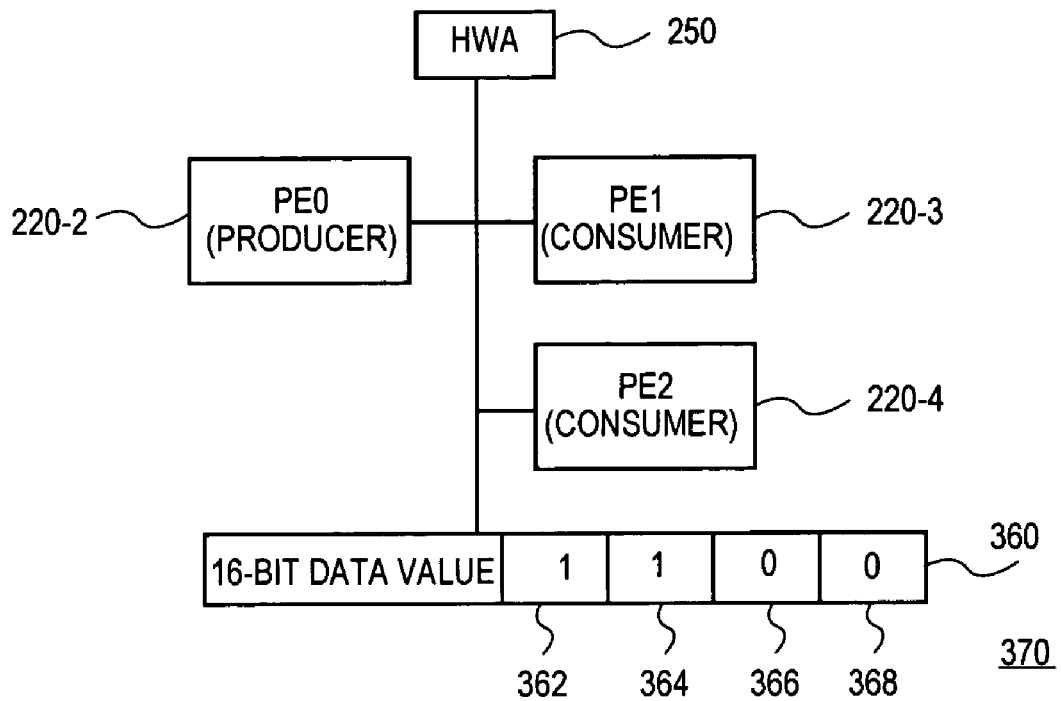

FIG. 2 is a block diagram further illustrating MSP 100, as depicted in FIG. 2. As illustrated, MSP 200 further illustrates configuration of the various processing elements 120. In one embodiment, a general processing element (GPE) is the basic processing element upon which more complicated PEs may be generated. In one embodiment, PEs may be categorized as: input processing elements (IPE), which are connected to input ports to accept incoming data streams; general processing elements (GPE), multiply accumulate processing elements (MACPE); and output processing elements (OPE), which are connected to output ports to send outgoing data streams for performing desired processing functionality.

In addition, MSP 200 includes an internal memory for local data and variable storage to alleviate bandwidth bottlenecks on the off chip memory. For example, MSP 200 may include a machine readable storage medium such as data random access memory (RAM) 270, as well as a memory conimand handler (MCH) to handle a plurality of data streams. As illustrated, input PE 220-1, as well as output PE 220-5 handle input and output processing of data streams, whereas PEs 2202 to 220-4 perform some sort of algorithmic functionality with the use of hardware accelerators 250 (250-1, . . . , 250-n). In addition, each PE 220 may include, for example, 16 local registers and indirect registers which may be, for example, 16 bits wide and can be used for either 16 bit operands or 8 bit operands. In order to perform the desired media processing functionalities, the various PEs utilize register file 210.

In one embodiment, register file 300 is used as register file 210 to allow the PEs to exchange data and also provide the general purpose registers for data manipulation as illustrated in FIG. 3A. In one embodiment, data valid (DV) bits implement a semaphore system to coordinate data flow, as well as ownership of the general purpose registers (GPR) 310 (310-1, . . . , 310-n) by a PE. In one embodiment, all PEs 220 are required to follow a standard, pre-defined semaphore protocol, as depicted with references to FIGS. 4-9, when sharing data to and from register file 300. In one embodiment, each PE 220 has, for example, as 128 instruction memory to hold instructions. Typically, the instructions may consist of one or more loop operations in addition to some data flow and arithmetic instructions.

In one embodiment, the GPRs 310 exchange data between PEs 220 by tagging data passing through the GPRs 310 with a data valid (DV) bit 306 (306-1, . . . , 306-n). The purpose of the DV bit 306 is threefold: to establish ownership of the data storage resource; and to establish one or more consumers of data; and to identify activation of a selected hardware accelerator. In the embodiment illustrated in FIG. 4, PE to PE data synchronization is described. Initially, PE0 220-2 may request enablement of a selected hardware accelerator (HWA) 250 by, for example, setting HWA DV bit 362 (bit 304 in FIG. 3A) with the result written to GPR 360, which is meant for consumption by PE1 220-3. As such, PE0 asserts DV bit 364. In addition, HWA DV bit 362 is also set to signify control of HWA 250 by PE0 220-2.

In one embodiment, the setting of HWA DV bit 362 alerts control logic 230 that a processing element is requesting enablement or activation of HWA 250. In one embodiment, as depicted in FIG. 3B, a general purpose register 320 may be designated as a control register for control logic 230 (FIG. 2). In accordance with such an embodiment, a PE 220 is responsible for writing control data to the designated register 320, such that the register 320 functions as a command channel for control block 230. In one embodiment, the PE 220 is responsible for indicating a selected hardware accelerator (HWA select) 322 identifying input data 324 for the hardware accelerator, as well as identifying a location for output data. In one embodiment, PE 220 directs an HWA 250 to perform a media processing function by writing to control data 330. In an alternative embodiment, a controller (not shown) could be responsible for setting controller 230 (FIG. 2) to enable a designated hardware accelerator.

Figure 6:
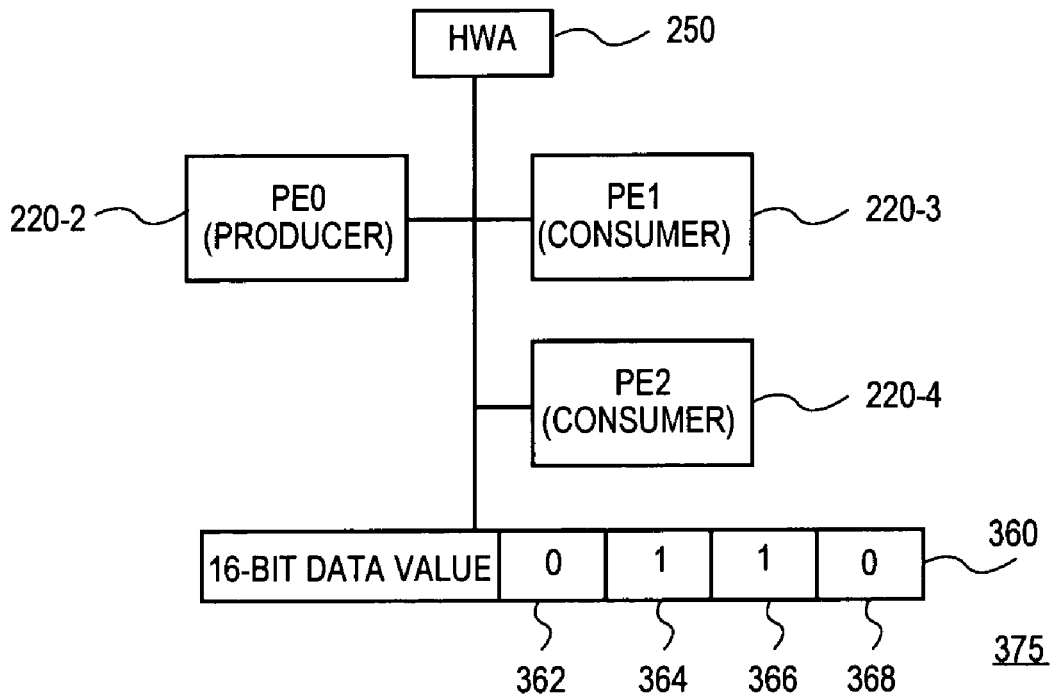

Referring again to FIG. 5, HWA DV bit 362, as well as DV bit 364, are set by PE0 220-2 to initially claim ownership of GPR0 360, as well as indicating that generated data is provided by selected hardware accelerator 220. PE1 220-3 is depending on the data in GPR 360 and stalled until it is available. As illustrated, until the data is available, PE1 220-3 and PE2 220-4 are stalled. As such, once HWA performs it calculations and writes output data into GPR 360, the DV bit 366 of PE1 is set, as depicted in FIG. 6. In one embodiment, since DV bit 366 is set in GPR 360, PE1 can now read the data and continue execution. Assuming the data in GRP 360 is needed just once by PE1 220-3, PE1 220-3 clears its corresponding DV bit 366 along with the data read. In one embodiment, a read instruction to a register 310, along with resetting the DV bit, is performed as one instruction.

Figure 7:
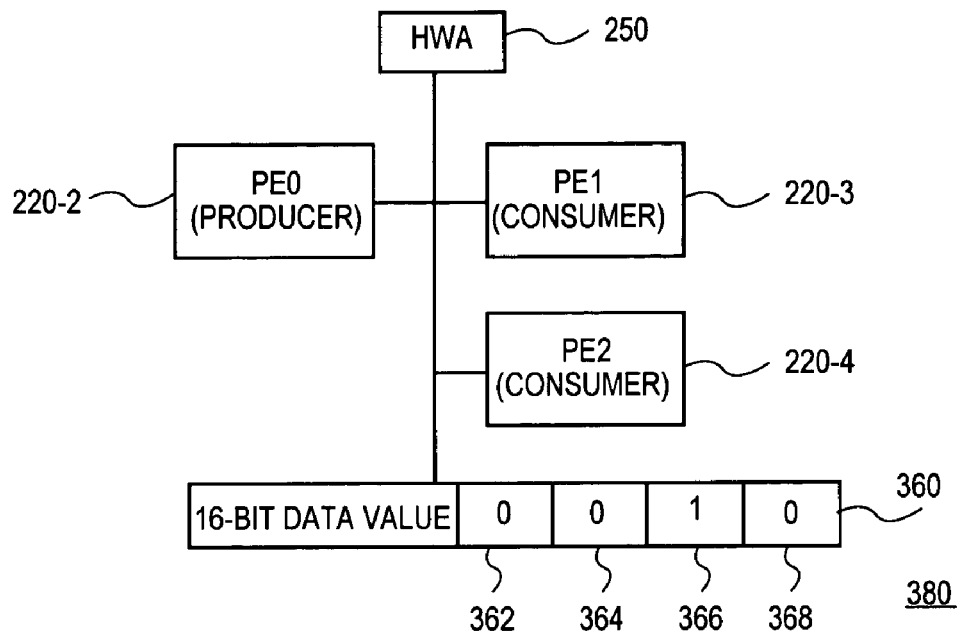
Figure 8:
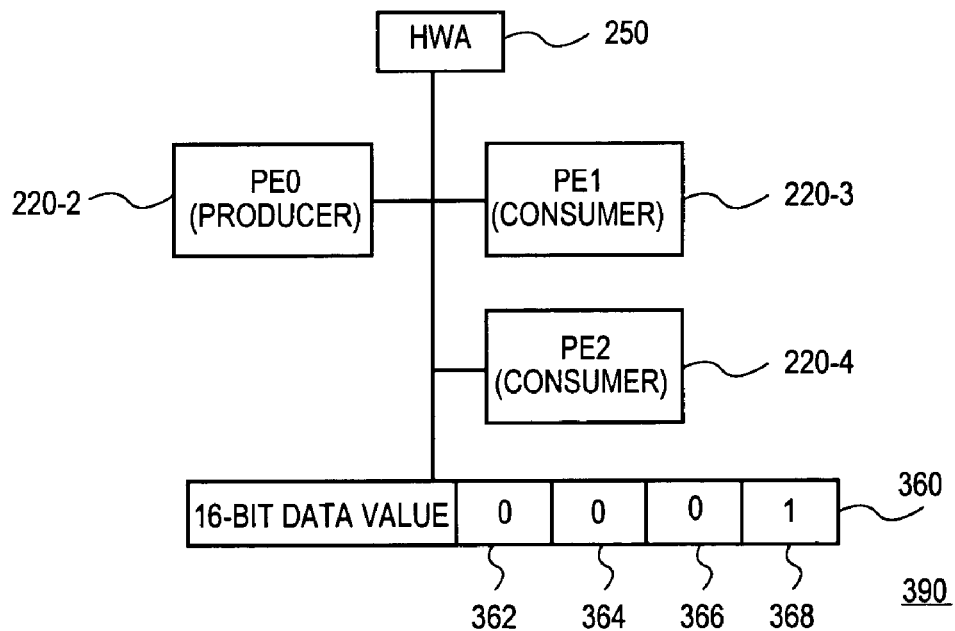

In FIG. 7, PE0 220-2 generates a new piece of data for PE2 220-4 and writes the result to GPR 360. PE0 sets DV bit 368 once the data is written into GPR 360 to enable PE2 220-4 to read the data. PE0 resets DV bit 362 signifying that it is finished with GPR 360, as depicted in FIG. 8. Detection of assertion of DV bit 368 signifies that data is available for consumption. As a result, PE2 is released from stall, because DV bit 368 is set to resume processing. Next, PE2 220-4 reads data from GPR 360 and clears DV bit 368.

Figure 9:
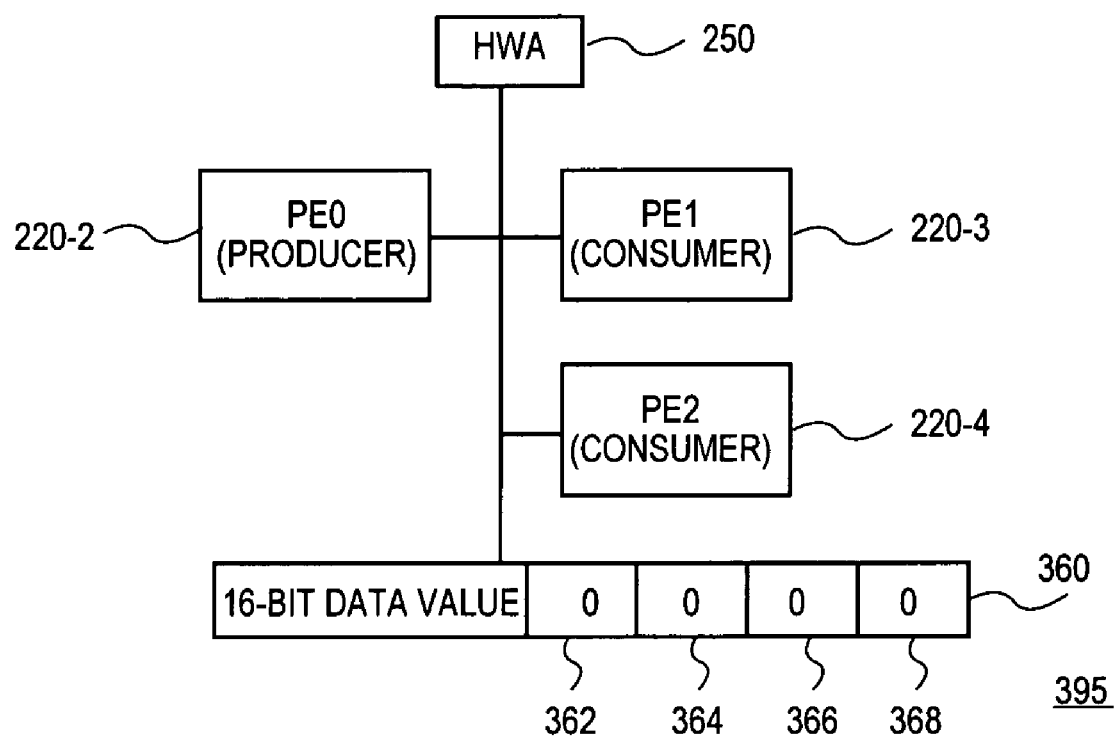

Accordingly, once cleared, GPR 360 is available to all PEs 220 since all DV bits are reset as illustrated in FIG. 9. As described herein, the terms "set" or "assert" as well as "reset" or "deassert" do not imply a particular logical value. Rather, a bit may be set to "1" or set to "0" and both are considered embodiments of the invention. As a result, a bit may be active "0" (asserted low signal) or active "1" (asserted high signal) in accordance with the embodiments described herein.

Accordingly, by utilizing DV bits, PEs are able to designate ownership of a GPR 310 within register file 300 (FIG. 3A). In one embodiment, detection of a set DV bit causes stalling of PE 220, which are dependent on the data, until the data is written into the GPR 360. In one embodiment, HWA DV bit 362 indicates whether the requested data is generated by a PE 220 or a selected HWA. In one embodiment, a control register 320 (FIG. 3B) is accessed to identify the HWA 250 and the PE 220 that selected the HWA 250. Accordingly, various PEs 220 of MSP 200 are data driven and function irrespective of indicated program data flow.

Figure 10:
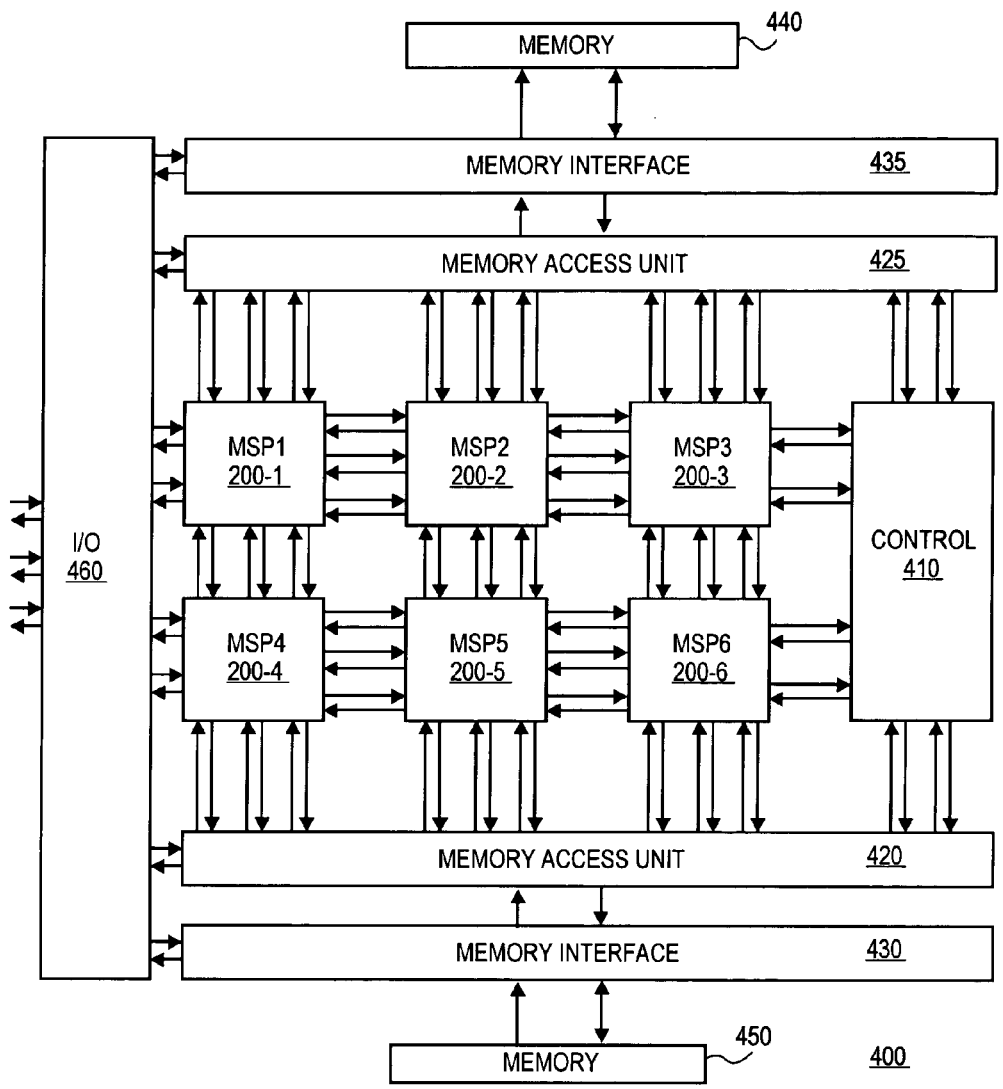
FIG. 10 is a block diagram illustrating a media processor, in accordance with one embodiment of the invention.

FIG. 10 illustrates a block diagram incorporating a plurality of MSPs 200 coupled together to form a media processor 400 in accordance with one embodiment of the invention. As illustrated, MSPs 200 include various ports that enable bi-directional data connection that allows data to flow from one unit to another. As such, each port has the ability to send and receive data simultaneously through various separate uni-directional data buses. In one embodiment, the various ports of the MSPs 200 consist of first in first out (FIFO) devices in each direction between two units, controlled via, for example, a port selection register.

Accordingly, any port in a unit can connect to a port of each of the other MSPs 200 which may utilize a data bus, which is, for example, 16 bits wide. Accordingly, media processor 400 utilizes the plurality of MSPs 200 to freely exchange and share data, which accelerates the performance of data intensive applications, such as audio, video and imaging applications.

Furthermore, by including various HWAs within MSPs 200 of media processor 400, media processor 400 is used within video processing applications, image processing applications, audio processing applications, or the like. In addition, by incorporating security-based accelerators, such as for example, stream and block ciphers, as well as key generators, media processor 400 secure data exchanged for the desired media processing application. In addition, media processor 400 includes memory access units 420 and 425, as well as memory interface units 430 and 435. Likewise, input/output (I/O) block 460 provides access to various I/O devices.

Figure 11:
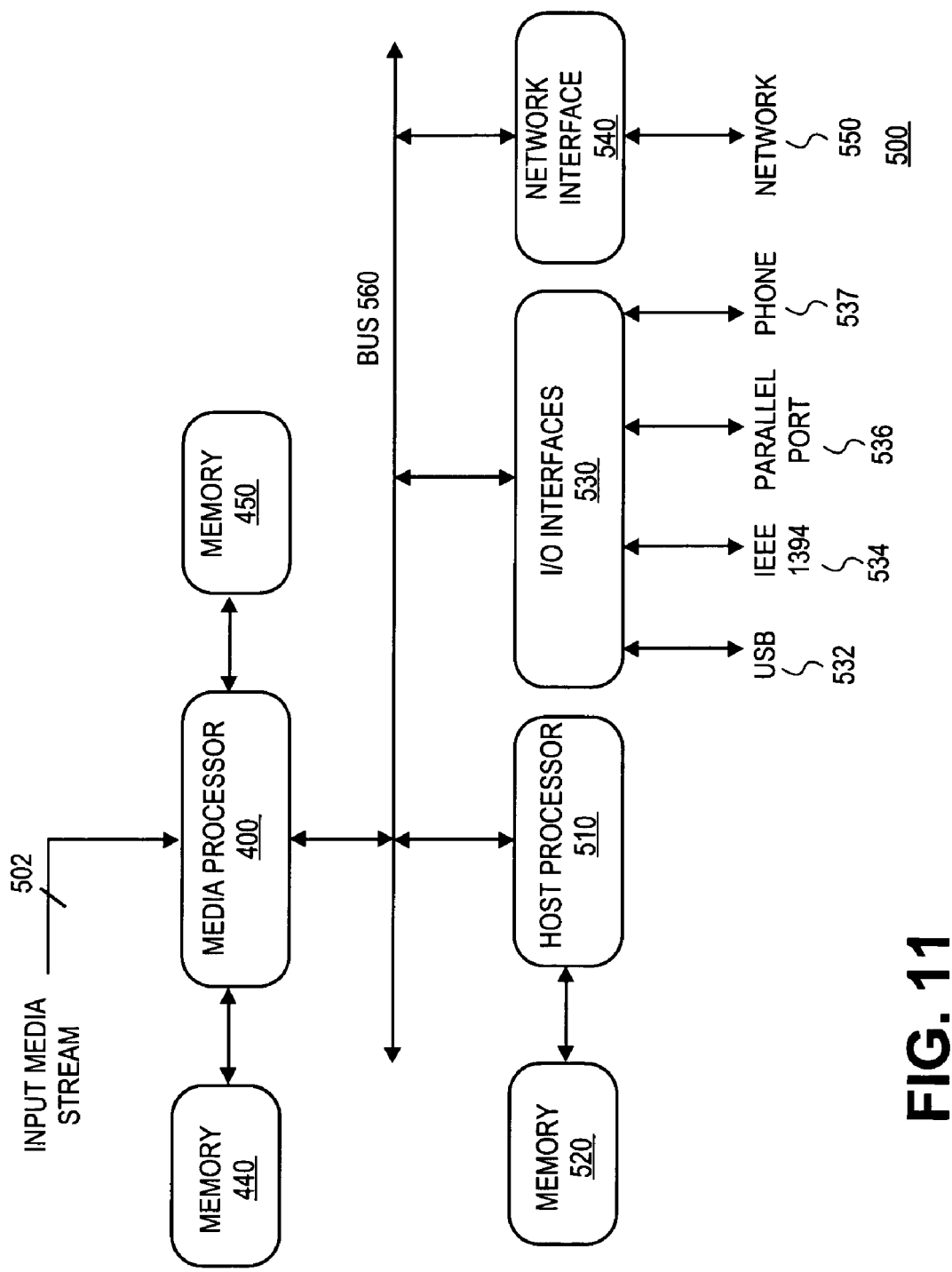
FIG. 11 is a system level diagram illustrating a media processing architecture, in accordance with one embodiment of the invention.

In one embodiment, media processor 400 may be incorporated into a data driven architecture to provide desired media processing functionality. In one embodiment, a data driven media architecture 500 is illustrated with reference to FIG. 11. As such, FIG. 11 illustrates a system level diagram of a data driven media architecture 500 in accordance with one embodiment of the invention. The media architecture 500 includes media processor 400 coupled to machine readable storage mediums such as memory 450 and 440. In one embodiment, the memory is, for example, dual data rate (DDR) synchronous data random access memory (SDRAM) which runs at, for example, 133 MHz (266-MHz DDR devices).

As illustrated input media stream 502 is provided to media processor 400, which processes a media stream, such as, for example, pixel information and audio stream, video stream, or the like. Media processor 400 is coupled to, for example, a bus, such as for example, a peripheral component interconnect (PCI) bus. The bus 560 enables coupling to a host processor 510, which is coupled to memory 520. Likewise, bus 560 couples to I/O interfaces 530, which may include universal serial bus (USB) 532, Institute of Electrical and Electronics Engineers (IEEE) protocol 1394, parallel port 536 and phone 537. Furthermore, network interface 540 may couple network 550 to bus 560.

Accordingly, as media architecture devices evolve toward more general purpose media processing implementations, the desire for, for example, fixed media processing function accelerators, will increase in contrast to very large and complex hardware accelerators in current use within image signal processors. For example, a media signal processor may implement a media processing function such as a sum of absolute differences (SAD) engine that would get used only during video encoding operations. The same MSP may also have a scaling accelerator that gets used only during display operations. Additional media processing functions may also be a variable length code decoder block that gets used during the bit stream decode phase of, for example, a motion picture experts group (MPEG) video playback operation.

In accordance with embodiments described, each of these accelerators can exist in the same MSP without taking up valuable bits in the instruction word of the PEs or the PE select bits in the communication registers, as depicted with reference to FIGS. 1-3B. Accordingly, hardware accelerators used by the media signal processor described herein can maintain their context when switched out of the path of the communication control registers in a data driven architecture. In addition, modifications in the path of the PE select bits enables disabling of hardware accelerators when not in use. Accordingly, utilizing, for example, a dedicated control register, PEs are able to control selection of a desired hardware accelerator.

Alternate Embodiments

Several aspects of one implementation of the MSP for providing a media have been described. However, various implementations of the MSP provide numerous features including, complementing, supplementing, and/or replacing the features described above. Features can be implemented as part of the media or as part of a digital signal in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a MSP, it will be appreciated by those skilled in the art that the embodiments of the present invention can be applied to other systems. In fact, systems for data driven fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   detecting an update to a register file accessible by a plurality of processing elements of a media signal processor when a processing element desires ownership of a selected hardware accelerator;
   enabling the hardware accelerator selected from a plurality of hardware accelerators in response to one or more address bits and a control command detected within a register within the register file that are written by the processing element to identify and request ownership of the selected hardware accelerator; and
   granting the processing element ownership over the selected hardware accelerator, the selected hardware accelerator to perform a media processing function according to the detected control command.

2. The method of claim 1, wherein enabling the selected hardware accelerator comprises:
   designating at least one register within the register file to receive control commands from the plurality of processing elements; and
   activating the selected hardware accelerator to perform a media processing function according to a control command detected within the register.

3. The method of claim 1, further comprising:
   providing a selection unit coupled to the plurality of hardware accelerators;
   designating at least one register within the register file to receive control commands from the plurality of processing elements;
   directing the selection unit to provide a processing element with access to a selected hardware accelerators; and
   directing the selecting hardware accelerator to perform a media processing function according to a received control command.

4. The method of claim 2, wherein activating the selected hardware accelerator comprises:
   identifying a processing element having written the control command;
   determining, according to the control command, an input data stream for the selected hardware accelerator;
   determining, according to the control command, an output data stream for the selected hardware accelerator;
   directing the selecting hardware accelerator to perform a media processing function according to a received control command;
   updating a control bit within a register of the register file to indicate whether data is available for one or more data dependent processing elements; and
   requiring the one or more data dependent processing elements to wait to execute instructions until the data it needs to execute the instructions is available in one or more registers.

5. A machine-readable storage medium storing instructions, which when accessed by the computer result in the computer performing a method, comprising:
   detecting an update to a register file accessible by a plurality of processing elements of a media signal processor when a processing element desires ownership of a selected hardware accelerator;
   enabling the hardware accelerator selected from a plurality of hardware accelerators in response to one or more address bits and a control command detected within a register within the register file that are written by the processing element to identify and request ownership of the selected hardware accelerator; and
   granting the processing element ownership over the selected hardware accelerator, the selected hardware accelerator to perform a media processing function according to the detected control command.

6. The machine-readable storage medium of claim 5, wherein the enabling the selected hardware accelerator further comprises:
   designating at least one register within the register file to receive control commands from the plurality of processing elements; and
   activating the selected hardware accelerator to perform a media processing function according to a control command detected within the register.

7. The machine-readable storage medium of claim 6, wherein activating the selected hardware accelerator further comprises:
   identifying a processing element having written the control command;
   determining, according to the control command, an input data stream for the selected hardware accelerator;
   determining, according to the control command, an output data stream for the selected hardware accelerator;
   directing the selecting hardware accelerator to perform a media processing function according to a received control command;
   updating a control bit within a register of the register file to indicate whether data is available for one or more data dependent processing elements; and
   requiring the one or more data dependent processing elements to wait to execute instructions until the data it needs to execute the instructions is available in one or more registers.

8. The machine-readable storage medium of claim 5, wherein the method further comprises:
   providing a selection unit coupled to the plurality of hardware elements;
   designating at least one register within the register file to receive control commands from the plurality of processing elements;
   directing the selection unit to provide a processing element with access to a selected hardware element; and
   directing the selecting hardware accelerator to perform a media processing function according to a received control command.

9. A processor, comprising:
   a plurality of processing elements;
   a plurality of hardware accelerators coupled to a selection unit; and
   a register file coupled to the selection unit and the plurality of processing elements, the register file including a plurality of general purpose registers accessible by the plurality of hardware accelerators, the selection unit and the plurality of processing elements, at least one of the general purpose registers including one or more address bits to allow a processing element to identify and request ownership of a hardware accelerator in response to one or more address bits and a control command detected within a register within the register file that are written by a processing element when the processing element desires ownership of the selected hardware accelerator; and a control unit to direct the selection unit to activate the selected hardware accelerator to grant the processing element ownership over the selected hardware accelerator, the selected hardware accelerator to perform a media processing function according to the detected control command.

10. The processor of claim 9, wherein the plurality of processing elements comprise:

an input processing element coupled to said register file, the input processing element to receive input data; and an output processing element coupled to the register file, the output processing element to transmit data.

11. The processor of claim 9, wherein the section unit to receive a control command from a processing element within at least one register of the register file, and activate the selected hardware accelerator to perform a media processing function according to the received control command.

12. The processor of claim 9, wherein the control unit to identify a processing element having written a control command, and set a control bit within a register of the register file to indicate when data is available for the identified processing element from the selected hardware accelerator.

13. The processor of claim 9, wherein a processing element to set a bit when the processing element desires selection of a hardware accelerator and set one more bits to identify one or more data dependent processing elements to prevent the identified processing elements from executing instructions until the one or more bits are reset.

14. The processor of claim 9, wherein the processing element to write a control command to a at least one register within the register file to direct a selected hardware accelerator to perform a media processing function according to the control command and set a control bit to indicate the selected hardware accelerator is in use.

15. The processor of claim 9, wherein a processing element to set one or more control bits within a register of the register file to identify one or more data dependent processing elements to stall the identified processing elements and prohibit execution of instructions until data required by the identified processing elements is available in one or more registers.

16. The processor of claim 9, wherein the hardware accelerators comprise image processing hardware accelerators.

17. The processor of claim 9, wherein the hardware accelerators comprise video processing hardware accelerators.

18. The processor of claim 9, wherein the hardware accelerators comprise audio processing hardware accelerators.

19. A system comprises:

a plurality of media signal processors coupled together via input and output ports to enable data exchange between each media signal processor, the media signal processors including:

a plurality of processing elements;

a plurality of hardware accelerators coupled to a selection unit;

a register file coupled to the selection unit and the plurality of processing elements, the register file including a plurality of general purpose registers accessible by the plurality of hardware accelerators and the plurality of processing elements, at least one of the general purpose registers including one or more address bits to allow a processing element to identify and request ownership of a hardware accelerator;

a control unit coupled to the selection unit to direct the selection unit to activate the selected hardware accelerator in response to one or more address bits and a control command detected within a register within the register file that are written by a processing element when the processing element desires ownership of the selected hardware accelerator to grant the processing element ownership over the selected hardware accelerator;

a memory interface coupled to one or more of the media processors; and a random access memory coupled to the memory interface, wherein the section unit to receive a control command from a processing element within at least one register of the register file, and activate the selected hardware accelerator to perform a media processing function according to the received control command.

20. The system of claim 19, wherein the control unit to identify a processing element having written a control command and set a control bit within a register of the register file to indicate when data is available for the identified processing element from the selected hardware accelerator.

21. The system of claim 19, wherein a processing element to set a bit when the processing element desires selection of a hardware accelerator and set bits corresponding to one or more data dependent processing elements to prevent the identified processing elements from executing instructions until the one or more bits are reset.

22. The system of claim 19, wherein the processing element to write a control command to a at least one register within the register file to direct a selected hardware accelerator to perform a media processing function according to the written control command and set a control bit to indicate a hardware accelerator is in use.

23. The system of claim 19, wherein a processing element to set one or more control bits within a register of the register file to identify one or more data dependent processing elements to stall the identified processing elements and prohibit execution of an instructions until data required by identified processing elements is available in one or more registers.

24. The system of claim 19, wherein the random access memory (RAM) is one of a synchronous data random access memory (SDRAM) and a double data rate (DDR) SDRAM.

* * * * *